United States Patent Office 2,941,280
Patented June 21, 1960

2,941,280

SHEET METAL FABRICATION

Charles A. Heuer and Charles O. Kunz, Alton, Ill., assignors to Olin Mathieson Chemical Corporation, East Alton, Ill., a corporation of Virginia No Drawing. Filed Oct. 3, 1955, Ser. No. 538,282

9 Claims. (Cl. 29—157.3)

This invention relates to metal working and more specifically to a composition utilized in preventing pressure welding and to its method of application.

In a process of fabricating hollow articles such as disclosed in U.S. Patent No. 2,690,002, which involves pressure welding or forging in selected areas and further development toward completion of the article by fluid pressure inflation, there is employed a weld preventing or separation material which is applied in any desired pattern on one of component layers of sheet metal in preparation for those layers being forged and welded together in areas not separated by the composition. Compositions of this type heretofore found suitable are generally of a graphitic nature including solid or solids-forming additives of one sort or another. Such separation material must be capable of retaining the desired pattern design while it elongates with the metal in the pressure welding step and during such elongation it must consistently prevent welding in the pattern area. Graphite, coal and the like have been disclosed, for instance in U.S. 2,212,481, issued August 20, 1940, to Sendzimir, for use as a weld preventing material but in the form disclosed are not satisfactory because of the difficulty encountered in applying the pattern, because of the frequent failure upon elongation of the pattern to satisfactorily prevent welding, and because of included gaseous and other deleterious matter.

These compositions, while generally satisfactory for the purpose in the fabrication of hollow sheet metal articles, may leave in the interior of such articles excessive residue which in the fabrication of certain kinds of articles must then be removed by an internal cleaning process which usually includes a chemical cleaning such as by the use of pickling acids and the like agents which themselves oftentimes must be very meticulously removed so as not to interfere with the ultimate intended use of the hollow article.

Therefore, one object of this invention is to provide for such process of fabricating hollow articles an economical weld preventing composition which will not leave difficultly removable or undesired residues in the fluid inflated passageways and will consistently prevent welding in the desired areas. Another object is the provision of a new such separation material and a method for the graphic application of sharp thin patterns in the fabrication of hollow articles of aluminum and the like metals. Another object is the provision of an assembly of sheet metal with a relatively thin, adherent stop weld pattern thereon especially suited for the fabrication of hollow articles by such process. Other objects and advantages will become apparent from the following description in detail of a preferred embodiment of the invention.

These objects are attained in accordance with this invention by utilization in such process of a novel layer or stratum of a weld preventing material made up of particles of graphite largely distributed within a certain size range and applied by the method described hereinafter. More specifically it has been found that particles of graphite the major portion of which have a size of not less than about 1 micron are necessary for the purpose. The largest part of the particles should be of semi-colloidal size, i.e., within the range from about ½ micron to about 50 microns with most at the lower end of the range at around 5 or 10 microns. For the purpose of most efficient satisfactory applicability, the graphite particles are dispersed by means of any suitable dispersing agent in a suitable liquid vehicle such as water which can be easily driven off by volatilization. The composition is formulated to a solids content in the range from about 10 percent to about 60 percent by weight, but preferably around 30 percent to 40 percent. The resultant thixotropic hydrosol is maintained at a desired consistency manifested by an apparent viscosity of between about 10,000 and about 180,000 centipoise as measured by a Brookfield Viscometer using a standard type spindle operated at a speed of 10 revolutions per minute at a temperature of about 72° F.

While this aqueous suspension of semi-colloidal graphite particles having a size within the prescribed range may be brushed on or printed or otherwise graphically applied, it preferably is graphically applied by means of a single pass of a squeegee over a screen stencil. The apparent viscosity at the time of use preferably should be less than about 80,000 centipoise but more than about 15,000 centipoise for a hydrosol of greater solids content having fewer of the smallest size particles and more than about 30,000 centipoise for a hydrosol of lesser solids content having more of the smaller size particles. Whenever the consistency is considerbaly over about 140,000 centipoise difficulty in application by the screening method may occasionally be encountered. The solids content, i.e. percent graphite by weight, is the property which governs the coating thickness or density provided the material is of the proper screening viscosity.

Stencil silk screens found capable of impressing a pattern of suitable sharpness without interference with deposition of the pattern are of a size ranging from about 8XX (86 mesh or holes to the lineal inch) to 17XX (about 162 mesh) according to the standard silk screen specifications well known to the graphic arts. A silk screen mesh of 12XX (about 125 mesh) is preferred. The X's refer to the strength of weave of the strands.

In order to obtain proper screening and the desired density of stop-weld composition the proper consistency of the wet composition as manifested by apparent viscosity and percent solids by weight is quite important.

Proper thickness of coating (density) is essential for consistent weld prevention. After application the material is dried to leave a rather thin stratum or layer of weld preventing material having a sufficient thickness ordinarily corresponding to a density of deposit from about ½ milligrams per square centimeter to about 2½ milligrams per square centimeter. The superposed contiguous component sheets of metal and the coating are then subjected to a metal working step which squeezes the components together and concomitantly elongates them. This is ordinarily done by rolling as set forth in the aforementioned U.S. Patent No. 2,690,002. At lesser thicknesses of graphite deposit, discontinuities tend to occur in the elongated layer resulting during rolling, and generation of the hollows by inflation becomes more difficult to the point of complete inoperability. A pattern density of from about 1.3 to about 1.4 milligrams per square centimeter is preferred. This corresponds to a ratio of about 22.6 of percentage of solids content to coating density found to be the optimum as far as screenability and deposition of the desired pattern thickness are concerned.

A form of graphite found particularly adaptable and suitable for the purposes of this invention and containing a suitable dispersing agent and particle size is that known as "Prodag" which is an ammoniacal hydrosol product of the Acheson Colloid Corporation of Midland, Michigan, and likewise that known as "Superflake No. 5" made by Superior Graphite Company of Chicago, Illinois, and also available in the form of a hydrosol. The graphite particles which constitute this hydrosol are characterized by an average size within the range from about 25 microns to about 35 microns. Nearly all of the particles are of a size less than 30 microns and the bulk are of less than 5 microns. A large portion of the graphite particles of this second material have a semi-colloidal size ranging below about 5 microns and practically none are of a size in excess of 10 microns. The size of the particles of these materials varies according to a histogram or frequency distribution curve skewed in the direction of larger particles and ranges from the smaller particles of colloidal size to larger particles of semi-colloidal size a few of which may be as large as 100 microns. These commercially available dispersions or suspensions of colloidal or semi-colloidal graphite are graphically applied to weldable metal surfaces as a pattern in any suitable way but it is preferred that they be applied through a silk screen stencil with suitable dilution and consistency. A mixture applicable through a silk screen stencil ordinarily contains about 30 percent graphite by weight and the balance substantially all water together with a suitable dispersing agent.

Illustrative examples of mixtures found to have acceptable performance both in screening and in the pressure welding step of the process of hollow article fabrication are the following:

*Table I*

| Material | Apparent Viscosity (centipoise) | Solids, Percent | Dry Coating Density, mgm./cm.² | Ratio— Solids to Density |
|---|---|---|---|---|
| Prodag | 48,000 | 30 | 1.092 | 27.3 |
| Prodag [1] | 52,800 | 31 | 1.4 | 22.1 |
| Prodag | 32,800 | 32.2 | 1.42 | 22.7 |
| Superflake #5 | 66,000 | 37.1 | 1.71 | 21.7 |
| Superflake #5 | 16,000 | 36.4 | 1.24 | 29.3 |
| Superflake #5 | 102,000 | 37.0 | 1.13 | 33.3 |
| Prodag | 58,400 | 32.0 | 1.39 | 22.8 |
| Superflake #5 | 52,400 | 37.7 | 1.70 | 22.2 |

[1] Thickened with carboxymethyl cellulose.

By way of example, the weld preventing material of this invention has been found to be especially suitable in the fabrication of inflatable sheet metal structures of aluminum. Two component sheets of a commercially available form of aluminum unalloyed with other constituents in softened condition are readily cleaned by being subjected to scratch brushing on those surfaces which are to be juxtaposed and superposed in order to render these surfaces of the component aluminum sheets amenable to welding by hot rolling. Then the separation material is graphically applied to one of these weldable surfaces in any desired unidirectionally foreshortened pattern of such configuration and design that upon completion of the fabrication procedure there will be produced a passageway within the body of the completed article of predetermined shape and dimensions. The pattern is preferably applied in an adherent layer or stratum by means of a single pass of a squeegee over a silk screen having a mesh of about 12XX, and is dried leaving a coating of weld preventing material of a thickness corresponding to a density of about 1.33 milligrams per square centimeter. Then one component sheet with a dried pattern of separation material thereon is superposed with the other component sheet so as to sandwich the pattern between the sheets at the brushed contiguous faces. These component sheets are then maintained in superposition without relative slipping at the interface in any suitable manner, as by welding at the edge. This preliminary assembly of sheets is then uniformly heated to bring the sheets up to some uniform temperature within the range from about 1000° to not less than about 700° F. The heated assembly while in this temperature range is then passed to a rolling mill where the assembly is ordinarily reduced in thickness by about 65%. At this stage the component sheets have substantially completely lost their identity and the product now virtually consists of a single body of metal with interior surfaces separated only by the enveloped thin pattern of weld preventing material which has undergone elongation along with the constituent metal. If desired, the resultant body of sheet metal may be subjected to further metal work and treating operations such as cold rolling, annealing, pickling, polishing and the like to produce a sheet of desired gage, temper and surface finish.

By silk screen is meant a screen of silk or the like suitable durable strand.

The elongated pattern of weld preventing material in the resultant sheet metal body is of a size and character as such that it may be utilized to admit fluid pressure within the interior of the sheet along the stratum to thereby readily distend the metal in the area of the pattern and produce passageways of a predetermined final configuration. After inflation any residual graphite which might adversely affect subsequent use of the product is readily removed by flushing with steam.

By means of the present invention various advantages are secured in the process of fabricating hollow articles by a process including preferential or selective pressure welding and fluid inflation. A chief advantage of the weld preventing composition described herein is that it introduces no excessive or additional materials which remain as a residue after the pressure welding step is completed and which are removable by a cleaning operation only with difficulty and at a considerable expense. Another advantage is that it may be applied very readily through a silk screen stencil with a substantial reduction in the tendency of such materials to clog the openings in the screen. Thus the material is adaptable to sustained usage without interruptions for replacement of screens. Furthermore it has been found that the material can be applied in a more sharply delineated pattern and that it is applicable in a thin stratum to a thickness less than that heretofore obtainable and still remains suitable for the purpose of preventing welding between sheets in areas where the material is applied. As a result less material need be applied and less need be cleaned out of the passageways which develop in the articles upon the application of fluid pressure therein. The material of this invention although applied rather thinly has been found to be capable of resisting a tendency to suffer a development of discontinuities during the necessary elongation which the metal undergoes during processing and which would be responsible for undesired points of welding in the area of the separation material. Since the composition of this invention consists of particles of graphite substantially free from foreign particles there is no need for any lengthy or critical compounding procedure to make up a suitable mixture or batch. Moreover as a result of the absence of foreign particles full advantage can be taken of the lubricating qualities of the graphite particles which facilitates the insertion of the inflation nozzle or needle into the extension of the pattern exposed at an edge at which an inlet is made for connecting the interior of the embryonic passageways of the hollow article with an external source of fluid pressure which accomplishes final shaping of the tubes or passages of the hollow article.

Since many other embodiments of this invention may occur to those skilled in the art, it is to be understood that the foregoing is intended as illustrative of preferred embodiments and not as a limitation of the spirit and scope of the present invention except as set forth in the appended claims.

What is claimed is:

1. Coated stock having an adherent layer of weld preventing material applied in a continuous elongatable pattern disposed over a portion of the area between component layers of sheet metal adapted for joinder by forge welding except in the area of the pattern, said material comprising particles of graphite devoid of binder applied to a thickness corresponding to a density of not less than about ½ of a milligram per square centimeter, and said particles having a size distribution in the range from about ½ micron to about 50 microns.

2. Coated stock having an adherent layer of weld preventing material applied in a continuous elongated pattern disposed over a portion of the area between component layers of sheet metal adapted for joinder by forge welding except in the area of the pattern, said material comprising particles of graphite devoid of binder applied to a thickness corresponding to a density of from about 1.3 to 1.4 milligrams per square centimeter, and said particles having a size distribution in the range from about ½ micron to about 50 microns.

3. In the process of manufacture of hollow articles of sheet metal, the step comprising interposing between superposed component metal sheets a stop weld composition consisting substantially of a hydrosol of particles of graphite to form when dried an adherent weld preventing continuous elongatable pattern area between a portion of the juxtaposed weldable surfaces of the superposed component sheets of metal, said hydrosol being devoid of binder and containing about 30 percent by weight of said particles and having an apparent viscosity in the range from about 30,000 centipoise to about 80,000 centipoise with said particles having a size distribution in the range of from about ½ micron to about 50 microns wherein a majority of said particles have a size between the range of from about 5 microns to about 10 microns, and joining the juxtaposed weldable surfaces of said superposed component sheets of metal not separated by said composition.

4. In the process of hollow articles of sheet metal, the steps comprising interposing between superposed metal component sheets a weld preventing material comprising substantially of a hydrosol of graphite particles, said hydrosol devoid of binder and having a solids content within the range from about 10 percent to about 60 percent by weight of said particles and an apparent viscosity of not more than about 140,000 centipoise with said particles having a size distribution in the range from about ½ micron to about 50 microns drying the applied coating to form an adherent continuous elongatable pattern area having a thickness corresponding to a coating density within the range from about ½ milligram to 2.5 milligrams per square centimeter, and joining the juxtaposed weldable surfaces of said superposed component sheets of metal not separated by said weld preventing material.

5. In the process of manufacture of hollow articles of aluminum sheet metal from component layers the steps comprising scratch brushing the to-be-juxtaposed surfaces of component layers of aluminum graphically applying to the scratch brushed surface of a component layer an aqueous dispersion essentially of colloidal and semi-colloidal graphite devoid of binder and having an apparent viscosity within the range from about 10,000 centipoise to about 80,000 centipoise and a solids content of about 30 percent by weight in a weld preventing continuous adherent elongatable pattern area adapted to be sandwiched between a portion of the juxtaposed weldable surfaces of superposed component layers of aluminum, said particles having a size distribution in the range of from about ½ micron to about 50 microns drying the pattern to provide a pattern coating having a density of about 1.3 to 1.4 milligrams of graphite per square centimeter, and then pressure welding the interfacial areas of said component sheets not occupied by said pattern by rolling the components together.

6. A sheet of metal having a surface treated to render it pressure weldable in combination with a weld preventing material applied over a portion of the area of said surface in a continuous elongatable pattern adherent to said surface, said material comprising particles of graphite devoid of binder and largely having a size not less than about from ½ to 1 micron aggregated to about a thickness corresponding to a coating density within the range from about ½ to about 2½ milligrams per square centimeter.

7. In a process of pressure welding superposed sheets of material having therebetween of a portion of the area a predetermined continuous adherent elongatable pattern of weld-preventing material, the step which comprises forming said pattern with an aqueous suspension of from 10 to 60% of particles of graphite devoid of binder in which said particles have a size distribution in the range from about ½ micron to about 50 microns, said suspension having an apparent viscosity within the range from about 10,000 centipoise to about 180,000 centipoise.

8. A structure comprising a fixed layer of weld-preventing material devoid of binder and having the shape of a continuous relatively planar pattern disposed over a portion of the area between component layers of sheet metal adapted for being joined in the remainder of said area adjoining the area of said pattern, said material comprising particles of graphite which have a size distribution in the range from about ½ of a micron to about 50 microns, said particles being cohered to a thickness corresponding to a density of not less than about ½ of a milligramme per square centimeter.

9. A process for preventing welding between adjacent surfaces of superimposed metal sheets subjected to welding pressures comprising interposing between said sheets a coating of stop-weld material comprised of graphite particles having a size distribution in the range from about ½ micron to about 50 microns with said coating being devoid of binder, and subjecting said sheets to said welding pressures.

References Cited in the file of this patent

UNITED STATES PATENTS

| | | |
|---|---|---|
| 2,212,481 | Sendzimir | Aug. 20, 1940 |
| 2,423,810 | Goulding | July 8, 1947 |
| 2,662,273 | Long | Dec. 15, 1953 |
| 2,690,002 | Grenell | Sept. 28, 1954 |
| 2,740,188 | Simmons | Apr. 3, 1956 |
| 2,754,572 | Johnson | July 17, 1956 |
| 2,759,246 | Campbell | Aug. 21, 1956 |
| 2,759,247 | Grenell et al. | Aug. 21, 1956 |
| 2,772,180 | Neel et al. | Nov. 27, 1956 |
| 2,786,265 | Keay | Mar. 26, 1957 |
| 2,882,588 | Rieppel et al. | Apr. 21, 1959 |
| 2,906,006 | Neel | Sept. 29, 1959 |

OTHER REFERENCES

New Advances in Printed Circuits, National Bureau of Standards Miscellaneous Publication 192, pp. 10–13 and 17–19.

UNITED STATES PATENT OFFICE

CERTIFICATE OF CORRECTION

June 21, 1960

Patent No. 2,941,280

Charles A. Heuer et al.

It is hereby certified that error appears in the printed specification of the above numbered patent requiring correction and that the said Letters Patent should read as corrected below.

Column 2, line 31, for "considerbaly" read -- considerably --; Column 5, line 15, for "elongated" read -- elongatable --; line 2, after "process" insert -- of manufacture --.

Signed and sealed this 29th day of November 1960.

(SEAL)
Attest:
KARL H. AXLINE
Attesting Officer

ROBERT C. WATSON
Commissioner of Patents